73-642 SR
12/10/85 OR 4,557,146

United States Patent [19]

Buffington et al.

[11] Patent Number: 4,557,146

[45] Date of Patent: Dec. 10, 1985

[54] SELECTABLE FOCUS ULTRASONIC TRANSDUCERS FOR DIAGNOSTIC IMAGING

[75] Inventors: Ralph M. Buffington; Perry Kaminski; Eugene A. Larson, all of Lewistown, Pa.

[73] Assignee: Technicare Corporation, Solon, Ohio

[21] Appl. No.: 570,702

[22] Filed: Jan. 13, 1984

Related U.S. Application Data

[63] Continuation-in-part of Ser. No. 400,547, Jul. 21, 1982, abandoned.

[30] Foreign Application Priority Data

Jul. 20, 1983 [EP] European Pat. Off. ........ 83304222.9

[51] Int. Cl.⁴ ............ G01N 29/00

[52] U.S. Cl. ............ 73/642; 335/153

[58] Field of Search ............ 335/153; 73/642

[56] References Cited

U.S. PATENT DOCUMENTS

| | | | |
|---|---|---|---|
| 3,193,198 | 7/1965 | Carlson | 335/153 |
| 3,587,011 | 6/1971 | Kurz | 335/151 |
| 3,754,208 | 8/1973 | Eilers | 367/150 |
| 3,968,680 | 1/1976 | Vopilkin et al. | 73/642 |
| 3,974,475 | 8/1976 | Burckhardt et al. | 367/191 |
| 4,016,751 | 4/1977 | Kossoff | 73/642 |
| 4,097,835 | 6/1978 | Green | 367/150 |
| 4,138,895 | 2/1979 | Mezrich | 73/642 |

FOREIGN PATENT DOCUMENTS

| | | | |
|---|---|---|---|
| 197708 | 9/1977 | U.S.S.R. | 367/150 |

*Primary Examiner*—Howard A. Birmiel
*Attorney, Agent, or Firm*—W. Brinton Yorks, Jr.

[57] ABSTRACT

Dual focus ultrasonic transducers are provided for a diagnostic imaging effective aspheric radiating surface. The transducers are formed of disc-shaped piezoelectric material. An annular groove separates the piezoelectric material into an inner disc region and an outer annular region for simultaneous activation or activation of the inner disc alone. The focus is changed by a reed switch connection to the two transducer regions, which permits proximity switch control of the transducer operation in a shielded environment for good noise performance.

11 Claims, 16 Drawing Figures

SELECTABLE FOCUS ULTRASONIC TRANSDUCERS FOR DIAGNOSTIC IMAGING

Figure 1A:
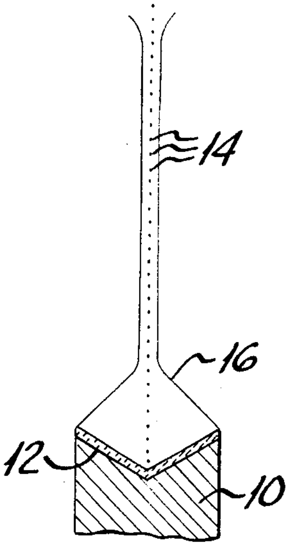

This is a continuation-in-part of Ser. No. 400,547, filed July 21, 1982, now abandoned.

This invention relates to ultrasonic transducers for diagnostic imaging and, in particular, to transducers of a novel geometric design with variable focal ranges and reduced sidelobe patterns.

Ultrasonic transducers are used in ultrasonic diagnostic systems to transmit waves of ultrasonic energy into a patient's body. Tissue interfaces in the body reflect some of this energy back toward the transducer in the form of echoes. The echoes are received by the transducer and converted into electrical signals. These signals may be processed by associating them with their times of arrival to reconstruct an image of the tissue or make fluid flow measurements.

In many applications of ultrasound it is desirable to be able to focus the waves or beams of ultrasonic energy at a particular tissue depth. Such focusing permits the reconstruction of images of good lateral resolution at a particular tissue depth of interest, for instance. Focusing may be done in the signal processing, as in the case of phased arrays, or may be provided by the geometric shape of the transducer. Geometric focusing advantageously eliminates much electrical complexity usually required to achieve the same result in the signal processing section of the system. However, geometric focal characteristics are idealized normally for only a single focal point or line of focal points, which restricts the range of good image resolution.

This restriction has been overcome by transducers having selectable geometric focal characteristics. A selectable focus transducer is shown in U.S. Pat. No. 4,138,895. The transducer there shown comprises a disc divided into a center electroded region and an annular electroded region. A user can select just the center electrode for a large depth of focus, or the central and annular regions together for a smaller depth of focus. An acoustic lens provides the transducer arrangement with the desired aperture with point focal characteristics.

Another important characteristic of transducers are sidelobe patterns. Transducers, like antennas, have transmissive characteristics that can be analyzed in terms of main and sidelobes. It is desirable in general to have small sidelobes for an ultrasonic transducer, since large sidelobes can result in the reception and introduction of noise in a reproduced ultrasound image.

It is desirable, then, for an ultrasonic transducer to have good geometric focal characteristics which are adjustable so as to provide good resolution over a range of tissue depths. It is further desirable to reduce the transducer sidelobe patterns so as to minimize noise in the reproduced image.

In accordance with the principles of the present invention, an ultrasonic transducer assembly is provided having a novel geometric focal characteristic. The transducer or transducer and lens arrangement resembles a concave spherical surface with opposite sides relative to the center of the surface canted toward each other in a semi-conical aspheric configuration. The geometric focal characteristic thus provides a concentration of ultrasonic energy over a particular range of interest.

In accordance with a preferred embodiment of the present invention, the transducer material is divided into a center disc and an annular ring. When the center disc is activated, the range of optimal focus is located a relatively short distance from the transducer. When both the center disc and annular ring are activated, the range of optimal focus is located at a relatively greater distance from the transducer.

In accordance with a further aspect of the present invention, sidelobes of a transducer of the present invention are reduced by apodization, wherein damping material is located at the outer periphery on the back of the transducer.

In accordance with yet another aspect of the present invention, a proximity switch is provided in the transducer assembly to switch between the long and short focal ranges. In order to prevent the introduction of noise into the received echo signals, the transducer electronics including the switch contacts are surrounded by a continuous shield. In a preferred embodiment of the present invention, the proximity switch comprises a reed switch which is controlled by a magnet located external to the shield. The use of a proximity switch such as a reed switch thus permits the focal ranges to be switched without physically interrupting the shield and hence impairing the noise characteristic of the transducer assembly.

Figure 1B:
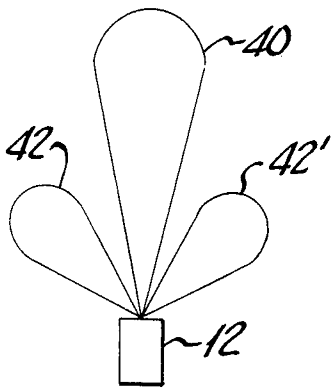
Figure 2A:
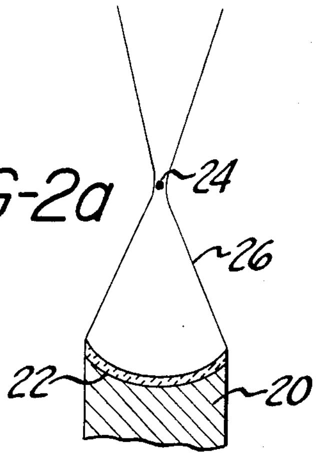
Figure 2B:
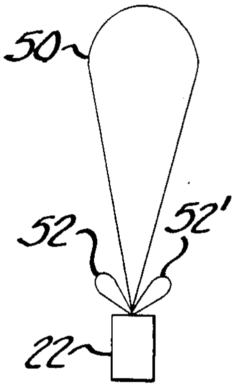
Figure 3A:
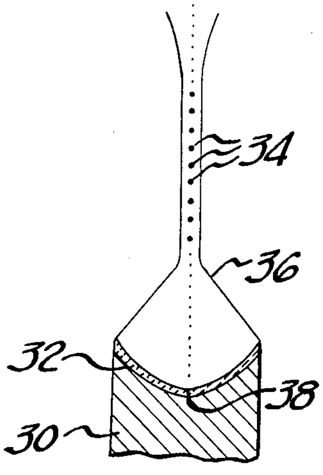
Figure 3B:
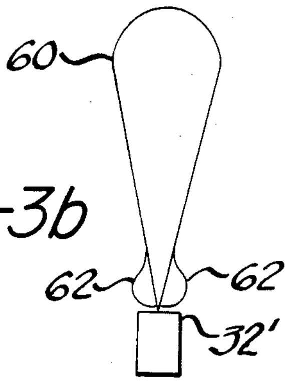
Figure 4:
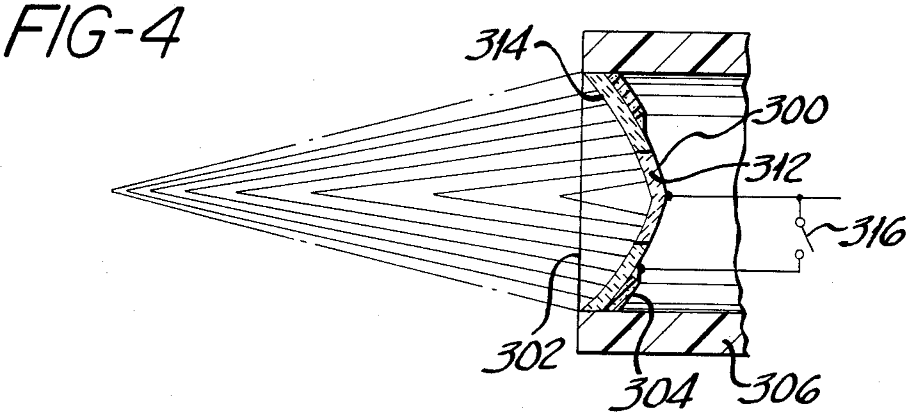
Figure 5:
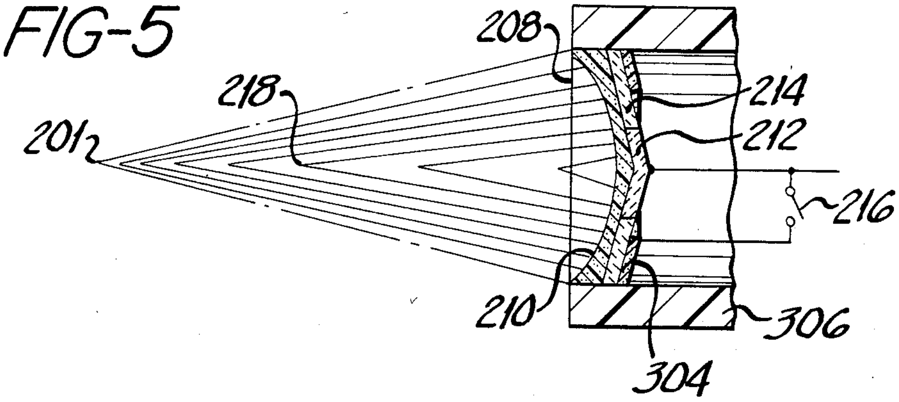
Figure 6:
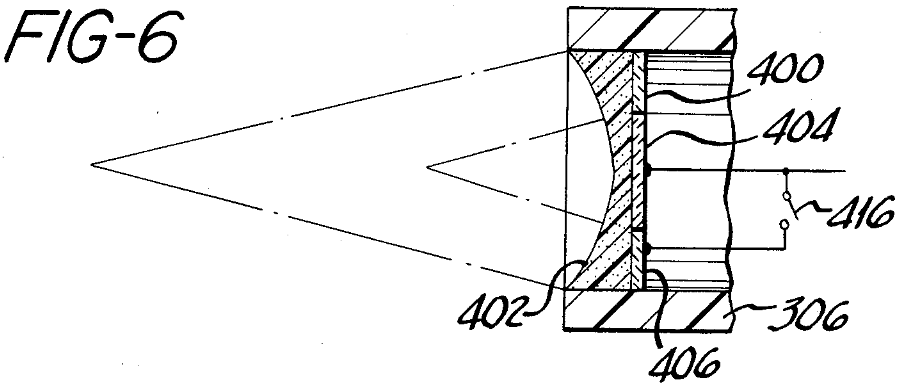
Figure 7C:
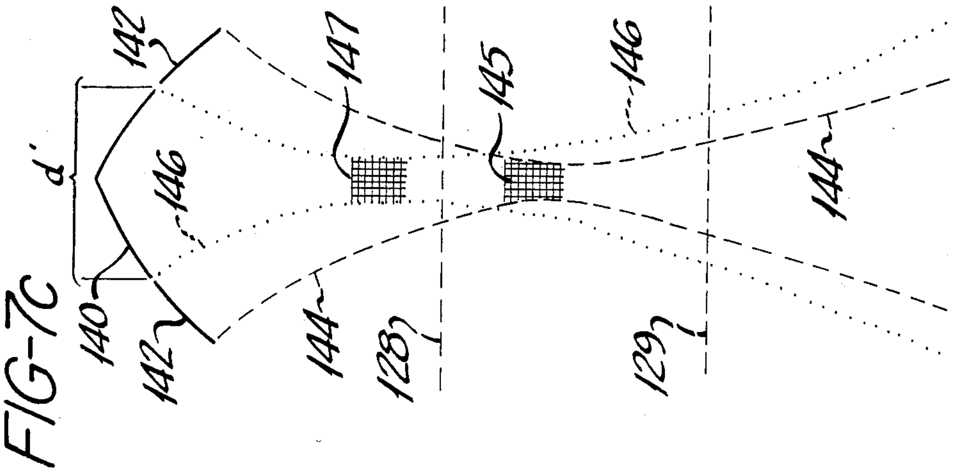
Figure 7B:
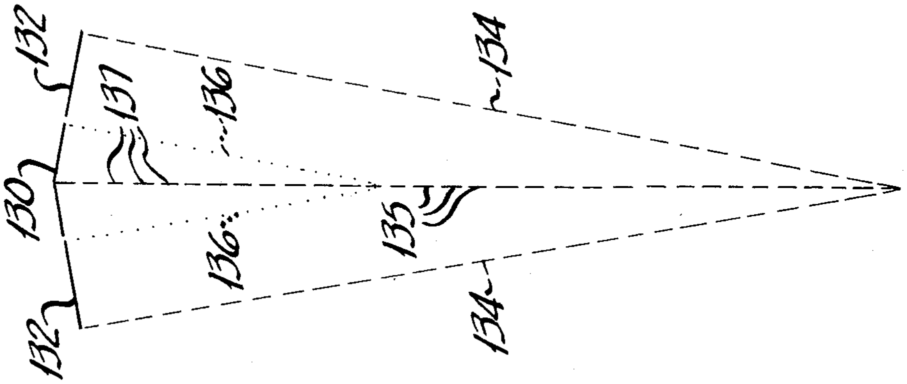
Figure 7A:
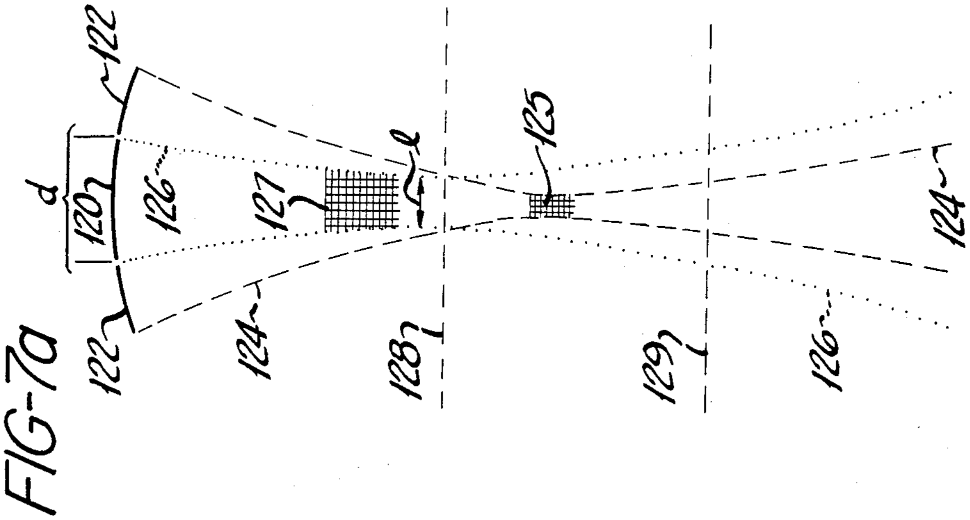

In the drawings:

FIGS. 1*a* and 1*b* illustrate idealized aperture and lobe patterns for a conical surface transducer;

FIGS. 2*a* and 2*b* illustrate idealized aperture and lobe patterns for a spherical surface transducer;

FIGS. 3*a* and 3*b* illustrate idealized aperture and lobe patterns for a transducer constructed in accordance with the principles of the present invention;

FIGS. 4, 5, and 6 illustrate different embodiments of transducers constructed in accordance with the principles of the present invention;

FIGS. 7*a*, 7*b*, and 7*c* illustrate idealized dual aperture spherical, conical and aspheric transducers; and FIGS. 8 and 9A–C are assembly drawings of transducer probes constructed in accordance with the principles of the present invention.

Referring first to FIG. 1*a*, a conical transducer is shown in cross-section. The transducer includes a conical surface 12 of piezoelectric ceramic material on a backer 10. The conical transducer exhibits an idealized aperture outlined at 16, which comprises a line of geometric focal points 14 emanating from the center of the transducer. Conical transducers are advantageous in that they exhibit a narrow region of sharply defined focal points. Their disadvantage is that the energy emitted by the conical surface is relatively evenly distributed over the line of focal points. It would be desirable to be able to concentrate the emitted energy in a particular region of the aperture, so as to improve the sensitivity of the transducer at a particular tissue depth of interest.

FIG. 2*a* illustrates a spherical transducer in cross-section. This transducer includes a spherical surface 22 of piezoelectric material mounted on a backer 20. The spherical transducer exhibits an idealized aperture outlined at 26, which contains a single geometric focal point 24. The ultrasonic energy emitted from the spherical surface of the transducer 22 converges at this point, and diverges beyond it. The spherical transducer is capable of producing sharply focused images of tissue in the vicinity of the geometric focal point 24 by reason of the concentrated ultrasonic energy at the point. However, the aperture is only sharply focused at one point, with resolution degrading at regions removed from this point.

A transducer constructed in accordance with the principles of the present invention is shown in cross-section in FIG. 3*a*. The transducer there shown is neither conical nor spherical, but exhibits many of the advantages of these two transducer types while overcoming several of their shortcomings. The novel transducer of FIG. 3*a* includes an aspheric surface 32 of piezoelectric material mounted on a backer 30. The shape of the surface 32 is difficult to visualize in three dimensions, but in two dimensional cross-section it resembles a spherical surface transducer which has been bent at the center point 38. The halves of the spherical surface on either side of the center point appear to be folded toward each other. The transducer exhibits the idealized aperture outlined at 36, in which most of the emitted ultrasonic energy is focused at points 34 in an elongated focal region. Unlike the conical and spherical transducers, the ultrasonic energy emitted by the novel transducer is neither focused along the entire center line of the transducer, nor is it focused at a single point. Rather, it is concentrated in an elongated region of optimal focus in which tissue of a significant depth can be imaged with good lateral resolution. The elongated region in a constructed embodiment of the present invention can extend over a six to seven centimeter depth for a 19 mm, 3.5 MHz transducer.

Different embodiments of transducers constructed in accordance with the principles of the present invention are shown in FIGS. 4, 5 and 6. In FIG. 4, an aspheric surface piezolectric element 300 includes a central area 312 which is electrically separate from an outer annulus 314. The piezoelectric material is mounted in a cylindrical mount 306. The inner area 312 may be activated alone, or a switch 316 may be closed to activate both areas 312 and 314 simultaneously to focus the transducer over different depths of focus. The concave front of the transducer 300 is filled in with an epoxy material to provide a flat face 302 on the transducer.

A preferred embodiment of the present invention is shown in FIG. 5. In this embodiment the piezoelectric material exhibits a conical shape, and contains an annular groove which divides the material into an inner conical region 212 and an annular outer region 214. The center region 212 may be activated alone or together with the annular region 214 by closing a switch 216. When the switch 216 is open, the center region 212 will focus in the near field out to a point 218 at approximately 9 centimeters, and when the two regions are activated together, far field focusing is effected out to a point 201 at approximately 14 centimeters.

On the face of the piezoelectric material is an acoustic lens having a spherical face 210. The combination of the conical piezoelectric material 212, 214 and the spherical faced lens provide the aspheric aperture characteristic of the embodiments of FIGS. 3*a* and 4. The concave lens is again filled in with epoxy to provide a flat face 208 on the transducer. In a constructed embodiment of FIG. 5, the acoustic lens 210 was composed of a high acoustic impedance and velocity epoxy material, and the filler material at 208 was a lower acoustic impedance and velocity epoxy material. The conical piezoelectric transducer 212, 214 and the spherical acoustic lens provide the desired elongated focal region aperture, and the filler 208 forms a simple plano-convex lens which extends the focal zone to point 201. It follows from the principles of this embodiment that an aspheric transducer could also be made utilizing a spherical piezoelectric disc and a conical faced lens.

The embodiment of FIG. 5 is more easily manufactured than the other illustrated embodiments of the present invention. This is because a conical ceramic transducer can be readily manufactured and the spherical acoustic lens can be formed by a simple lapping technique. The embodiment of FIG. 4, with its aspheric ceramic surface, should be formed by grinding the ceramic material with a precise, numerically controlled lathe, for example.

The embodiment of FIG. 6 is composed of a flat disc 400 of piezoelectric material, including a central disc 404 and an annular ring 406, the activation of which is controlled by a switch 416. The disc 400 is fronted with an acoustic lens 402 having an aspheric surface. This combination of piezoelectric material and aspheric lens will produce the same aperture as the embodiments of FIGS. 4 and 5.

It is desirable for a transducer to exhibit a radiation/-reception pattern with reduced sidelobes, since signals received from the sidelobe regions can introduce noise which will degrade image quality. A conical transducer such as that shown in FIG. 1*a* will exhibit a lobe pattern as shown in FIG. 1*b*, with a large main lobe 40 and sizeable sidelobes 42 and 42'. The large sidelobes 42 and 42' are undesirable in an ultrasonic diagnostic system.

The spherical transducer of FIG. 2*a* will exhibit a more acceptable lobe pattern as shown in FIG. 2*b*. The pattern there shown includes a large main lobe 50 and small sidelobes 52, 52'.

The aspheric transducer of the present invention will exhibit a lobe pattern intermediate those of FIGS. 1*b* and 2*b*. The lobe pattern of a transducer of the present invention is improved in accordance with a further aspect of the present invention by providing backing material around the outer perimeter of the transducer as shown at 304 in FIGS. 4 and 5. This ring of backing material damps vibrations at the outer perimeter of the piezoelectric material thereby reducing the energy radiated from the perimeter of the piezoelectric material. For the dual focus, two area transducers of FIGS. 4 and 5, the ring of backing material may be extended to back the central region 212 or 312 to damp vibrations at the perimeter of the central region when it is operated alone. This damping technique, generally referred to as apodizing, causes the transducer to be a non-uniform radiator, which "smears" the small side lobes of the transducer as shown in FIG. 3*b*, which illustrates a large main lobe 60 and side lobes 62, 62', which are approximately the same size as the side lobes 52, 52' of the spherical transducer.

A comparison of idealized apertures of different dual focus transducers is shown in FIGS. 7*a*, 7*b* and 7*c*. FIG. 7*a* illustrates the focal pattern of a simple dual aperture spherical transducer, including a central spherical region 120 and an outer annular region 122. When both regions 120 and 122 of the transducer are activated simultaneously, the transducer exhibits an aperture outlined at 124, which narrows sharply at a focal region 125. Focusing is ineffective beyond the near field limit 129 of the transducer, which is approximately equal to the radius of the transducer squared, divided by the wavelength of operation. The near field limit 129 is thus a linear function of the area of the transducer, which in this case is the total of both regions 120 and 122.

When the spherical transducer is switched to operate in the near field using only the center region 120, the aperture is as outlined by dotted lines 126. This aperture produces a focal region 127 closer to the transducer, with a near field limit at 128 by reason of the reduced area of the transducer. The aperture outlined at 126 does not narrow as sharply as the aperture outlined at 124, however, and the focal region 127 has a greater lateral dimension 1 than focal region 125. This is because the focus is changed by changing the near field limit from 129 to 128; the geometric focus remains the same, generally located slightly beyond the far focal region 125.

FIG. 7*b* illustrates the focal pattern of a simple dual aperture conical transducer having an inner conical surface 130 and an outer annular surface 132. When the inner conical surface 130 is activated alone, the energy from surface 130 focuses along the broken line shown at 137 and bounded by dotted lines 136. When both regions 130 and 132 are activated, the line of focal points is extended to include the points indicated at 135 as well as those at 137, bounded by dashed lines 134. Switching from operation using both regions to operation using only the center region 130 reduces the near field limit, since the transducer area changes, and also reduces the geometric focal length to only the focal points included in aperture outline 136. A line of distributed energy focal points is produced in both cases.

FIG. 7*c* illusrates the focal pattern of a dual focus aspheric transducer of the present invention. When both the central region 140 and the outer annular region 142 of the transducer of FIG. 7*c* are activated, a narrow focal region 145 is produced at the narrow portion of the aperture outlined by dashed lines 144. The area of the full transducer provides a near field limit indicated at 129.

When the transducer of FIG. 7*c* is switched to operation using the central region 140 alone, the area of the transducer is reduced, which moves the near field limit to the line indicated at 128. But the geometric focus of the transducer also changes, since its effective radiating surface is aspheric. Thus the aperture of the central region appears as outlined by dotted lines 146, containing a relatively narrow focal region 147. The focal region 147 is laterally narrower than region 127 of the spherical transducer by reason of the relocation of the geometric focus of the transducer to an area closer to the transducer. Good lateral resolution is therefore provided in both region 145 and region 147.

Since the geometric focus moves closer to the transducer when operation is switched from two region to central region operation, the diameter d' of the central region 140 can be made larger than the diameter d of the equivalent central region 120 of the spherical transducer of FIG. 7*a*. Several benefits result from use of a relatively larger central region. First, the larger region will transmit and receive more energy than a smaller region, thereby increasing the sensitivity of the transducer. Second, there is less of an impedance change when switching from double to single region operation, which makes the tuning electronics coupled to the transducer simpler. And third, the larger central region 140 contributes to the narrowing effect on the aperture 146.

Figure 8:
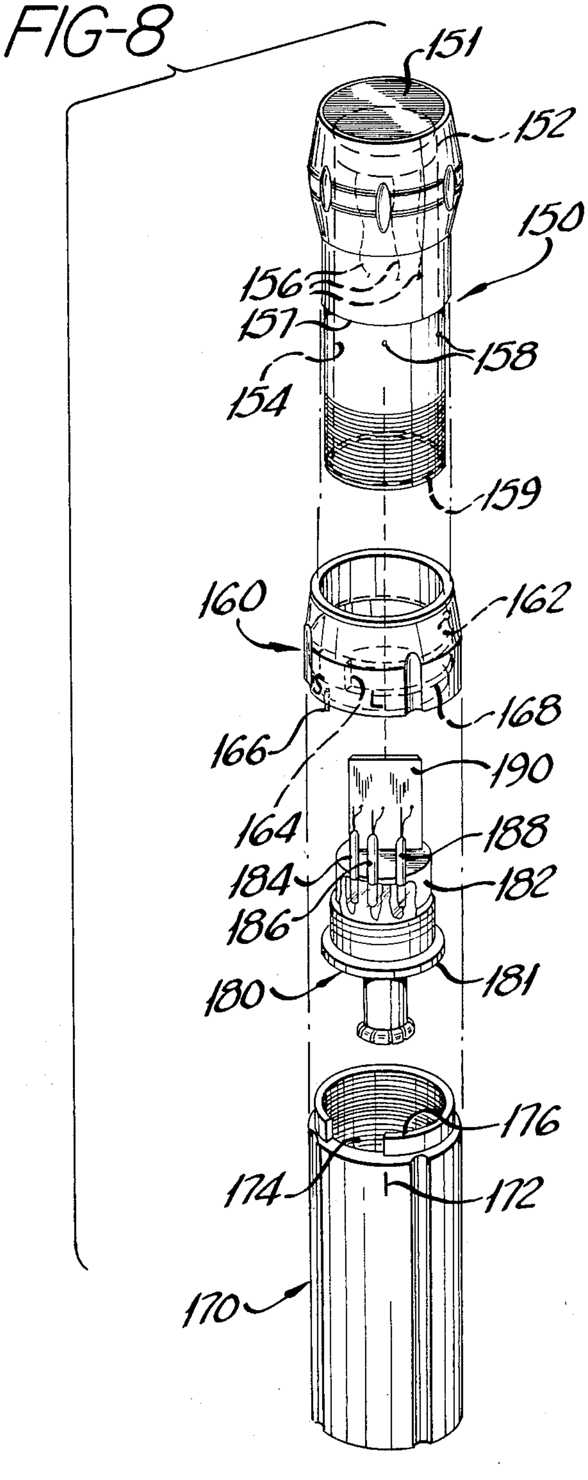

The ultrasonic transducer of the present invention is conveniently mounted in a probe assembly such as that shown in FIG. 8. The probe assembly there shown advantageously provides an electrically shielded environment which reduces the tendency to pick up stray electronic interference. The probe assembly also provides a means for switching the focus of the transducer in a manner which does not interrupt the shielded environment. As the focus of the transducer is switched, the tuning of the transducer is also changed and a signal is provided which indicates the selected focal characteristics.

The probe assembly of FIG. 8 includes a forward plastic cylindrical section 150 with a closed acoustic window face 151. The aspheric transducer 152 is located behind the window 151. Leads 156 extend from the separate regions of the transducer. The interior of the cylindrical section 150 is lined with a nonmagnetic shield 154 such as copper. The rear portion of the cylindrical section 150 narrows to a smaller diameter as indicated by dividing ridge 157. Two dimples shown at 158 are provided on the outside of the narrow portion which form a portion of the detent mechanism of the switch. The end 159 of the cylindrical section 150 is open.

A plastic ring 160 slides over the narrow portion of the cylindrical section 150 up to the ridge 157. On the inner surface of the ring 160 is a small ball 162 which rides between the dimples 158 and snaps into them to provide a detent mechanism for the ring. A groove 168 is formed around the inner surface of the ring to hold a magnet 164 in a predetermined position relative to the ball bearing 162. A small pin 166 extends from the inner surface of the ring at the bottom of the ring.

With the ring 160 in place on the forward cylindrical section 150, a rear cylindrical section 170 slides over the remainder of the narrow portion of section 150. A recessed collar 176 is then located under the ring 160. The collar 176 has a slot 174 in it so that pin 166 can move from one end of the slot to the other as the ring 160 is turned. The pin and slot thereby provide a stop for the ring to permit the ring to be turned only through the arc of the slot.

Finally, the wires 156 from the transducer are soldered to a small printed circuit board 190, mounted on an r.f. connector 180. The r.f. connector 180 is inserted into the open end 159 of the section 150 up to the lip 181 of the connector. Mounted on the connector at a plastic ring 182 are three reed switches 184, 186 and 188. The reed switches are wired to the printed circuit board 190. When the connector is inserted in the section 150 in the proper position, the reed switches are located under either side of the arc traversed by the magnet 164 as the ring 160 is turned. When the ring is turned to one detent position the magnet 164 is located over reed switches 184 and 186 to close them. And when the ring is in its other detent position the magnet is located over reed switch 188 to close it. The r.f. connector 180 and copper shield 154 provide a completely shielded cavity for the wiring, printed circuit board, switches, and board components in the inside of the section 150.

Turning the ring performs three switching functions in the probe assembly. First, the focal characteristics of the transducer are switched between short focus using only the central disc of the transducer, and long focus by connecting the central disc and annular ring of the transducer together to be activated simultaneously. Second, the tuning of the circuitry on circuit board 190 is switched to match the respective electrical characteristics of the transducer in the two operating modes. Third, a resistance value on the circuit board is changed to produce a signal indicative of the operating mode, which signal is coupled out through the connector along with signals to and from the transducer.

A second probe assembly constructed in accordance with the principles of the present invention is shown in FIG. 9. Like the probe assembly of FIG. 8, the arrangement of FIG. 9 provides a means for switching the focus of the transducer and simultaneous switching of tuning elements for the transducer. The arrangement of FIG. 9 is more compact than that of FIG. 8, and utilizes a different detent mechanism than the preceding embodiment.

Figure 9A:
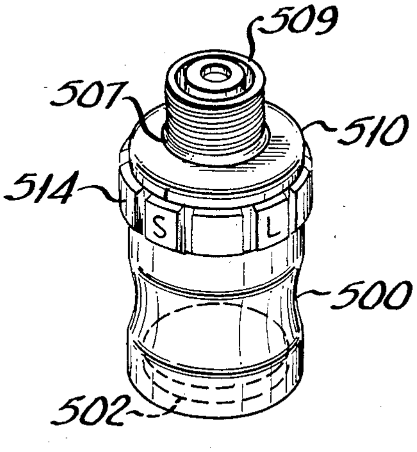

Referring first to FIG. 9A, a fully assembled probe is shown. The assembly includes a dual focus transducer 502 mounted at the end of a cylindrical section 500. Above the cylindrical section 500 is located a magnet ring 514, which is held in place by a retaining cap 510. An r.f. connector 509 is mounted on the end of the assembly, with an O-ring 507 sealing the junction of the r.f. connector and the retaining cap.

As in the previous embodiment, the magnet ring 514 is turned to switch the focus of the transducer between short and long focal regions. A magnet located inside the magnet ring will thereby open and close a magnetic reed switch located inside the assembly in proximity with the magnet. The magnet ring will stop in one of two detented positions, with either the "S" or the "L" lined up with the black indicator mark on the retaining cap.

Figure 9B:
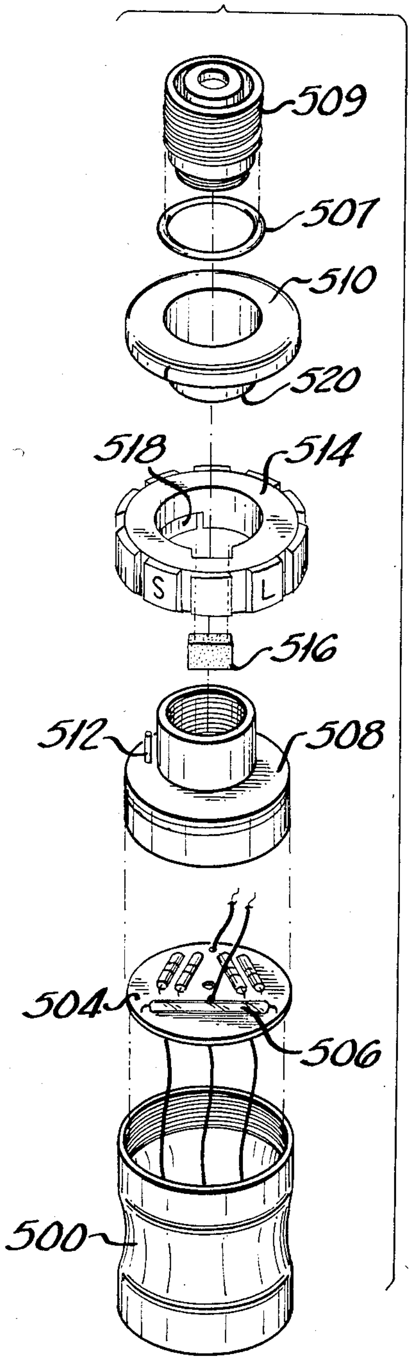

An exploded assembly drawing of the transducer assembly of FIG. 9A is shown in FIG. 9B. At the bottom of the drawing is the cylindrical section 500 which contains the transducer. The cylindrical section 500 is lined with copper foil shielding. The transducer is connected by wires to a printed circuit board 504, on which a magnetic reed switch 506 and various transducer tuning elements are mounted. The wires which extend from the top of the printed circuit board 504 connect to the r.f. connector 509.

Located above the printed circuit board and partially within the cylindrical section in the finished assembly is a metallic connector mount 508. The larger cup-like lower part of the mount encloses the printed circuit board and completes the electrically shielded environment in which the transducer and printed circuit board are located. The r.f. connector 509 is threaded into the smaller, upper part of the connector mount 508. A detent pin 512 is fixed in a hole drilled in the lower part of the mount.

The magnet ring 514 is located around the smaller upper part of the connector mount 508 and is separated from the metallic mount by a collar 520 extending downward from the retaining cap 510. Two notches are formed in the inner surface of the magnet ring 514. One notch accommodates the magnet 516, and the other notch holds a detent crescent 518 of Delrin plastic. The retaining cap 510 then holds the magnet ring 514 in place. The r.f. connector 509 is screwed into the connector mount 508 and the O-ring 507 is slipped into place.

Figure 9C:
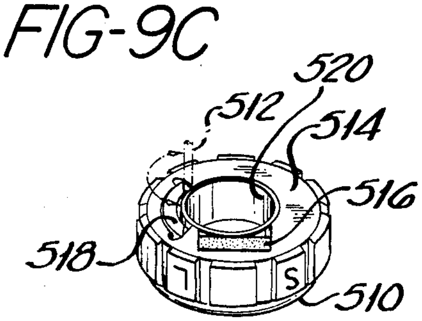

When the arrangement of FIG. 9B is assembled, the pin 512 and plastic crescent 518 form a detent mechanism, the operation of which may be understood by referring to FIG. 9C. As shown in that drawing, the detent crescent 518 is located in the notch along the inner surface of the magnet ring 514. The detent crescent is tapered at the ends, and is curved in an arc of a lesser radius than the arc of the collar 520 of the retaining cap. When assembly is complete, the detent pin 512 will ride along the space between the inside of the detent crescent and the collar 520. This movement is smooth and relatively free by reason of the arc of the curved crescent. As the magnet ring is turned, the detent pin glides smoothly between the crescent and the collar as indicated by the arrow in the drawing, and snaps into place whenever it reaches a position at one of the tapered ends of the detent crescent. The mechanism produces a tactile click whenever the detent pin reaches one of the end positions, thereby providing an indication to the user that the tranducer is properly adjusted for short or long focal region imaging.

What is claimed is:

1. A dual aperture ultrasonic transducer probe assembly for an ultrasonic diagnostic system comprising:

a housing having an electrically shielded interior space;

a dual aperture transducer having first and second electrically separate regions, said transducer being located at one end of said housing;

means, located in a wall of said housing, for making an electrical connection between said interior space and the exterior of said housing;

a reed switch, located in said shielded interior space, and connected to said first and second transducer regions and said electrical connection means for selectively coupling said region to said connection means; and a magnet located external to said shielded interior space and movably mounted so as to selectively open and close said reed switch for varying the coupling of said transducer regions to said electrical connection means.

2. The dual aperture ultrasonic transducer probe assembly of claim 1, wherein said reed switch has a first terminal coupled to said first transducer region, and a second terminal coupled to said second transducer region; and wherein said electrical connection means comprises an r.f. connector having a conductor connected to said first reed switch terminal.

3. A dual aperture ultrasonic transducer probe assembly for an ultrasonic diagnostic system comprising:

a housing having an electrically shielded interior space;

a dual aperture transducer having first and second electrically separate regions, said transducer being located at one end of said housing;

means, located in a wall of said housing, for making an electrical connection between said interior space and the exterior of said housing;

a reed switch, located in said shielded interior space, and connected to said first and second transducer regions and said electrical connection means for selectively coupling said region to said connection means;

a magnet located external to said shielded interior space and movably mounted so as to selectively open and close said reed switch for varying the coupling of said transducer regions to said electrical connection means;

wherein said reed switch has a first terminal coupled to said first transducer region, and a second terminal coupled to said second transducer region; and wherein said electrical connection means comprises an r.f. connector having a conductor connected to said first reed switch terminal; and further comprising:

a tuned circuit located in said shielded interior space; and a second reed switch located in said shielded interior space in close proximity to said external magnet, and connected to said transducer and said tuned circuit for selectively coupling said tuned circuit to said transducer.

4. A dual aperture ultrasonic transducer probe assembly for an ultrasonic diagnostic system comprising:

a housing having an electrically shielded interior space;

an ultrasonic transducer, located at one end of said housing, and having first and second electrically separate piezoelectric regions;

a reed switch, located in said shielded interior space, and having a first terminal connected to said first piezoelectric region and a second terminal connected to said second piezoelectric region;

an r.f. connector, located in a wall of said housing, and having a conductor connected to said first switch terminal; and a magnet, located external to said shielded interior space and in close proximity to said reed switch, and movably mounted for selectively closing said reed switch.

5. An ultrasonic transducer probe assembly for an ultrasonic diagnostic system comprising:

a cylindrical housing;

an ultrasonic transducer, located at one end of said housing, and having first and second electrically separate transducer areas;

a magnetic reed switch, located in said housing, and connected to said transducer areas so as to selectively electrically couple and disconnect said area; and a slideable ring of nonferrous material, mounted on said housing, and containing a magnet proximately located external to said housing with respect to said reed switch which, through movement of said ring, is capable of selectively controlling said reed switch.

6. The ultrasonic transducer probe assembly of claim 5, wherein said ring further includes a projection extending therefrom, and said housing further includes a groove for receiving said projection from said ring, wherein the length of said groove provides definition and limitation of the movement of said ring.

7. An ultrasonic transducer probe assembly for an ultrasonic diagnostic system comprising:

a cylindrical housing;

an ultrasonic transducer, located at one end of said housing, and having first and second electrically separate transducer areas;

a magnetic reed switch, located in said housing, and connected to said transducer areas so as to selectively electrically couple and disconnect said areas; and a slideable ring, mounted on said housing, and containing a magnet which, through movement of said ring, is capable of selectively controlling said reed switch;

wherein said ring further includes a ball-bearing partially projecting from the interior surface thereof, and wherein the exterior of said housing further includes first and second depressions for receiving said ball-bearing when said slidable ring is located in respective first and second detent positions.

8. The ultrasonic transducer probe assembly of claim 5, wherein said ring further includes a groove, and said housing further includes a projection extending therefrom and into said ring groove, wherein the length of said groove provides definition and limitation of the movement of said ring.

9. An ultrasonic transducer probe assembly for an ultrasonic diagnostic system comprising:

a cylindrical housing;

an ultrasonic transducer, located at on end of said housing, and having first and second electrically separate transducer areas;

a magnetic reed switch, located in said housing, and connected to said transducer area so as to selectively electrically couple and disconnect said areas; and a slideable ring, mounted on said housing, and containing a magnet which, through movement of said ring, is capable of selectively controlling said reed switch;

wherein said ring further includes a groove, and said housing further includes a projection extending therefrom and into said ring groove, wherein the length of said groove provides definition and limitation of the movement of said ring;

wherein said ring groove contains a crescent-shaped section of material having ends which lodge said projection in first and second detent positions in said groove.

10. The ultrasonic transducer probe assembly of claim 9, wherein said crescent-shaped section of material is curved so as to permit the smooth travel of said projection between said first and second detent positions as said ring is moved.

11. The ultrasonic transducer probe assembly of claim 10, wherein said projection comprises a metal pin, and said crescent-shaped section comprises a plastic material.

* * * * *